United States Patent [19]

Denzinger et al.

[11] Patent Number: 4,725,655

[45] Date of Patent: Feb. 16, 1988

[54] PREPARATION OF COPOLYMERS OF MONOETHYLENICALLY UNSATURATED MONO- AND DICARBOXYLIC ACIDS AND ANHYDRIDES

[75] Inventors: Walter Denzinger, Speyer; Heinrich Hartmann, Limburgerhof; Wolfgang Trieselt, Ludwigshafen; Albert Hettche, Hessheim; Rolf Schneider, Mannheim; Hans-Juergen Raubenheimer, Ketsch, all of Fed. Rep. of Germany

[73] Assignee: BASF Aktiengesellschaft, Ludwigshafen, Fed. Rep. of Germany

[21] Appl. No.: 919,583

[22] Filed: Oct. 16, 1986

Related U.S. Application Data

[63] Continuation of Ser. No. 811,326, Dec. 19, 1985, abandoned, which is a continuation of Ser. No. 730,262, May 6, 1985, abandoned, which is a continuation of Ser. No. 674,370, Nov. 26, 1984, abandoned, which is a continuation of Ser. No. 530,476, Sep. 8, 1983, abandoned.

[30] Foreign Application Priority Data

Sep. 11, 1982 [DE] Fed. Rep. of Germany ....... 3233778

[51] Int. Cl.$^4$ .................. C08F 2/10; C08F 222/04; C08F 220/06
[52] U.S. Cl. ........................................ 526/65; 526/87; 526/203; 526/228; 526/229; 526/240; 526/271; 526/318.2; 525/53; 525/244; 524/460; 524/833; 252/175
[58] Field of Search ............ 526/64, 65, 87, 203, 526/318.2, 228, 229, 240, 271; 525/53, 244; 524/460, 833

[56] References Cited

U.S. PATENT DOCUMENTS

| | | | |
|---|---|---|---|
| 2,838,475 | 6/1958 | Barrett | 526/271 X |
| 3,635,915 | 1/1972 | Gale | 526/271 X |
| 3,887,480 | 6/1975 | Rue et al. | 252/99 X |
| 3,956,380 | 5/1976 | Henning et al. | |
| 4,314,044 | 2/1982 | Hughes et al. | 526/317 X |
| 4,390,670 | 6/1983 | Walinsky | |

FOREIGN PATENT DOCUMENTS 51-140986 12/1976 Japan.

OTHER PUBLICATIONS

Chem. Eng.'s Hndbk., Perry et al. (Ed) (1973), pp. 4–24.
Chem. Reaction Eng'ing, Levenspiel (1962), pp. 161–163.
Chem. Reactor Design and Operation, Kramers et al. (1963), p. 20.

Primary Examiner—Joseph L. Schofer
Assistant Examiner—F. M. Teskin
Attorney, Agent, or Firm—Oblon, Fisher, Spivak, McClelland & Maier

[57] ABSTRACT

Copolymers which contain, as copolymerized monomer units, monoethylenically unsaturated mono- and dicarboxylic acids are prepared by a process in which (a) from 10 to 60% by weight of a monoethylenically unsaturated dicarboxylic acid of 4 to 6 carbon atoms, its salt and/or, if appropriate, its anhydride, (b) from 90 to 40% by weight of a monothylenically unsaturated monocarboxylic acid of 3 to 10 carbon atoms and/or its salt and (c) from 0 to 20% by weight of another, carboxyl-free monoethylenically unsaturated monomer which is copolymerizable with (a) and (b), the percentages being based on the sum of the monomers, are polymerized in the presence of from 0.5 to 5% by weight of a water-soluble free-radical-forming initiator in an aqueous medium at from 60° to 150° C., and, if appropriate, their anhydride groups are hydrolyzed, the monomers (a) and (b) being employed in a form such that from 20 to 80% of their amount is neutralized during the polymerization reaction, wherein the copolymerization is carried out continuously in a reactor cascade comprising several reactors, and an aqueous solution of a pre-prepared copolymer of (a), (b) and, if appropriate, (c) is initially introduced into all the reactors and heated to the required reaction temperature, the total amount of unneutralized or partially neutralized (a), not less than 40% by weight of unneutralized or partially neutralized (b), where relevant, all or some of (c), and some or all of the amount of initiator required for polymerization, with or without the amount of neutralizing agent required for the neutralization according to the definition, are metered into the first reactor, the remaining amount of unneutralized or neutralized (b) and, where relevant, (c), and any remaining amount of initiator and neutralizing agent which may be required are introduced into the second reactor or are distributed over the second reactor and the downstream reactors, and the reactants are allowed to react together during a residence time of from 0.5 to 8 hours. The above copolymers can be used as incrustation inhibitors or for scaling inhibition.

10 Claims, No Drawings

PREPARATION OF COPOLYMERS OF MONOETHYLENICALLY UNSATURATED MONO- AND DICARBOXYLIC ACIDS AND ANHYDRIDES

This application is a continuation of application Ser. No. 811,326 filed Dec. 19, 1985, now abandoned, which is a continuation of application Ser. No. 730,262 filed May 6, 1985, abandoned, which is a continuation of application Ser. No. 674,370 filed Nov. 26, 1984, abandoned, which is a continuation of application Ser. No. 530,476 filed Sept. 8, 1983, abandoned.

The present invention relates to a process for the preparation of copolymers of monoethylenically unsaturated mono- and dicarboxylic acids by continuous free-radical copolymerization of the monomers in an aqueous medium. The copolymers obtained are particularly useful as incrustation inhibitors or for scaling inhibition.

Prior Patent Application No. P 3,140,383.2 relates to a process for the continuous copolymerization of unsaturated mono- and dicarboxylic acids. In this method, polymerization is carried out in the absence of a solvent (mass polymerization) at from 200° to 400° C., and the products obtain have a relatively low molecular weight and a high residual monomer content and are not optimally suitable for use as, for example, incrustation inhibitors in detergents.

The proposal of prior Patent Application Ser. No. P 3,147,489.6 constitutes substantial progress. This application relates to a process for the preparation of copolymers which contain, as copolymerized monomer units, monoethylenically unsaturated mono- and dicarboxylic acids, in which (a) from 10 to 60% by weight of a monoethylenically unsaturated dicarboxylic acid of 4 to 6 carbon atoms, its salt and/or, if appropriate, its anhydride, (b) from 90 to 40% by weight of a monoethylenically unsaturated monocarboxylic acid of 3 to 10 carbon atoms and/or its salt and (c) from 0 to 20% by weight of another, carboxyl-free monoethylenically unsaturated monomer which is copolymerizable with (a) and (b), the percentages being based on the sum of the monomers, are polymerized in the presence of from 0.5 to 5% by weight of a water-soluble free-radical-forming initiator in an aqueous medium at from 60° to 150° C. and, if appropriate, the anhydride groups are hydrolyzed, wherein the monomers (a) and (b) are employed in a form such that from 20 to 80%.of their amount is neutralized during the polymerization reaction.

The resulting products have a very low residual monomer content and are powerful incrustation inhibitors. However, the process for their preparation entails a batchwise procedure, and is time-consuming and energy-consumptive since the dicarboxylic acid has to be initially introduced into the reactor and the monocarboxylic acid has to be metered in over a relatively long period (as long as 10 hours).

It is an object of the present invention to provide a process for the preparation of those copolymers obtainable by the method of the prior application, the novel process proceeding more rapidly and hence more economically and requiring a smaller amount of energy.

We have found that this object is achieved by a continuous process as defined in the claims. In this process, the reaction is carried out in a reactor cascade comprising several, preferably 3, reactors, which are preferably stirred kettles, but may also be static mixers or tube reactors. Before the reaction is started, an aqueous solution of a copolymer already obtained, for example as described in the above Patent Application Ser. No. P 3,147,489.6, is initially introduced into all the reactors. After the reactor contents has been heated to the reaction temperature according to the definition, the reaction is then started by introducing into the first kettle the total amount of unneutralized or partially neutralized dicarboxylic acid and not less then 40% by weight of the necessary unneutralized or partially neutralized monocarboxylic acid together with the amount of initiator required to initiate the reaction in this reactor and the amount of neutralizing agent, which may or may not be required, to neutralize 20-80% of the acids. At the same time, where the total amount of unneutralized or neutralized monocarboxylic acid has not already been introduced into the first reactor, the remaining amount of this, together with any further amounts of initiator and neutralizing agent which may be necessary and, if appropriate, the other comonomers (c), are metered into the second reactor or are distributed over the second reactor and the downstream reactors, and the reaction solution is removed continuously from the last reactor after a residence time of from 0.5 to 8, preferably from 1 to 5, hours.

Starting comonomers (a) of the novel process are monoethylenically unsaturated dicarboxylic acids, their salts and/or, where the steric arrangement of the carboxyl groups permits (cis position), their anhydrides. Examples of suitable dicarboxylic acids of 4 to 6 carbon atoms are maleic acid, itaconic acid, mesaconic acid, fumaric acid, methylenemalonic acid and citraconic acid and their salts and in appropriate cases their anhydrides.

Starting monomers (b) are monoethylenically unsaturated monocarboxylic acids and/or their salts. they contain 3 to 10 carbon atoms in the molecule. Acrylic acid and methacrylic acid are particularly suitable compound, but it also possibe to use, for example, vinylacetic acid, allylacetic acid, propylideneacetic acid, ethylidenepropionic acid, dimethylacrylic acid, $C_2$–$C_4$-alkyl half-esters of the above dicarboxylic acids, in particular of maleic acid, as well as mixtures of compounds from groups (a) and (b).

For the purposes of the present invention, salts of the carboxylic acids mentioned under (a) and (b) are alkali metal salts, preferably sodium salts and potassium salts, ammonium salts and organic amine salts, such as those of the tri-$C_1$–$C_4$-alkylamines, of hydroxyethylamine or of mono-, di- and tri-$C_1$–$C_4$-alkanolamines, and mixture of these. For the sake of simplicity, these will be referred to below as salts.

Where monomers (a) and (b) are employed, care should be taken to ensure that from 20 to 80, preferably from 30 to 70, % of these monomers, ie. the sum of (a)+(b), are neutralized, ie. these monomers are present in a partially neutralized form. This can be done by employing some or all of the dicarboxylic acids in the form of their salts and using the monocarboxylic acids in the form of the free acids. Conversely, it is also possible to use the dicarboxylic acids in the form of the free acids, or, where this is possible, in the form of their anhydrides, and to employ the monocarboxylic acids in the form of their salts. In any case, care should be taken to ensure that the ratio of free acids to the salts conforms to the total degree of neutralization defined above.

Among the preferably used alkali metal salts, it is advantageous to choose those which are most readily obtainable, ie. the sodium salts or potassium salts, preferably the sodium salts.

The procedure may also be carried out in a manner such that the acids are used in the free state or in an under-neutralized form, and the neutralizing agent is fed separately into the reactors. Suitable neutralizing agents are the bases from which the above salts are derived. KOH and NaOH are preferably chosen, the latter being of particular interest industrially.

Starting monomers (c) which do not necessarily have to be incorporated as copolymerized units, are carboxyl-free, preferably water-soluble monomers, which are copolymerizable with the monomers (a) and (b). Examples of these monomers include acrylamide, methacrylamide, acrylonitrile, methacrylonitrile, acrylamidosulfonic acid, vinylsulfonic acid allylsulfonic acid, vinylphosphonic acid, allylphosphonic acid, vinyl acetate, vinyl propionate, hydroxyehtyl acrylate, hydroxypropl acrylate, vinylglycol, methyl or ethyl acrylate or methacrylate, dimethylaminoehtyl acrylate or methacrylate and diethylaminoethyl acrylate or methacrylate. Provided that the degree of neutralization according to the definition is taken into account, the sulfonic acids and phosphonic acids mentioned can likewise by employed in the form of their alkali metal salts and/or ammonium salts and/or amine salts, or can be neutralized with additional neutralizing agent.

The mixture contains from 60 to 10, preferably from 45 to 20, % by weight of the monomers (a) and from 40 to 90, preferably from 55 to 80, % by weight of the monomers (b). The monomers (c) can be employed in an amount of not more than 20% by weight.

Examples of water-soluble free-radical forming initiators are hydrogen peroxide itself, peroxydisulfates, in particular Na perixydisulfate or ammonium peroxydisulfate, and azobis-(2-aminopropane) hydrochloride, as well as combinations of these. They can be metered at once into the first reactor, but it is frequently advantageous to feed portions into all the reactors.

It may be advantageous in some cases to add small amounts of redox coinitiators, e.g. sodium sulfite, sodium bisulfite, sodium dithionite, triethanolamine, ascorbic acid and salts of heavy metals.

The initiators are advantageously present in the mixture in an amount of from 0.5 to 6% by weight, based on the sum of the monomers. The polymerization takes place in an aqueous medium, and the concentration is advantageously chosen so that the aqueous solution contains from 20 to 70, preferably from 40 to 60, % by weight of total monomers.

Furthermore, the regulators conventionally used in free-radical polymerization in an aqueous medium, e.g. thioglycollic acid or $C_1$–$C_4$-aldehydes, or chain-lengthening agents, e.g. methylenebisacrylamide or divinylglycol, can be employed, the amounts used being from 0.1 to 5% by weight, based on the sum of the monomers.

The polymerization can be carried out, for example, as follows: the reactors are initially charged with copolymer solutions prepared by a batchwise procedure. The reactors are then heated to the polymerization temperature, which can vary within wide limits and is from 60° to 150° C., preferably from 80° to 130° C. The reactants are then advantageously metered into the reactors via metering pumps or other control equipment. Pure monomers, the neutralizing agent, the initiator and the water can be fed in separately, but it is advantageous to feed in the monomers in solution in water separately from the aqueous solutions of the neutralizing agent and initiator. In accordance with the invention, the total amount of dicarboxylic acid, preferably as the free acid or the anhydride, and not less than 40% of the monocarboxylic acid (from 20 to 80, preferably from 30 to 70, % of these acids being neutralized) are fed into the first reactor of the cascade, and the remaining amount of the monocarboxylic acid is metered into the second reactor. The comonomer (c) can either be introduced into the first reactor or be distributed over all the reactors. Where the reaction is carried out at above the boiling point of water, the reaction vessels of the cascade are pressure-resistant vessels, such as autoclaves.

When the polymerization is complete, the mixture is rendered either weakly or strongly alkaline depending on the intended use, and, where anhydrides are still present in the mixture, the anhydride groups are hydrolyzed. The resulting aqueous polymer solution can be used directly. However, the polymers can also be isolated in the dry form by evaporating down the solution, and the resulting product can be incorporated into, for example, pulverulent detergents. Finally, it is also possible to combine the aqueous solution directly with aqueous solutions containing other detergent components and to subject the resulting mixture to a conventional spray process.

The copolymers have K values of freom 8 to 100, in general from 10 to 60, and correspond to all the requirements of good incrustation inhibitors. They contain less than 1.5% of unreacted dicarboxylic acids, which is surprising because, particularly where alkali metal salts of dicarboxylic acids, such as maleic acid, are used, the opposite result is expected, ie. poorer polymerization. As is known, maleic anhydride polymerizes more readily than the free maleic acid or its alkali metal salt. The Examples which follow illustrate the invention. The K values are determined on the completely neutralized salts in accordance with H. Fikentscher, Cellulosechemie 13 (1932), 60, in 2% strength solution in water at 25° C. The monomeric maleic acid is determined by a polarographic method (cf. "Polarographische Arbeitsmethoden" by Dr. Mark von Stackelberg, published 1950, Verlag Walter De Gruyter & Co., Berlin W 35).

EXAMPLES

General Method of Preparation

The material initially introduced into the reactors is obtained by batchwise polymerization, for example as described in prior Application Ser. No. P 3,147,489.6. 1,800 parts of the copolymer solution are initially introduced into three reactors in proportion to their effective capacity, the copolymers having the composition described in the particular Examples. The solution is heated to the desired temperature (se Table), after which the starting materials shown in the Table are metered into the reactors via metering pumps. The discharge from the reactors is also effected by means of pumps, the levels in the reactors being kept constant. The number of parts given in the Examples are the amounts fed in per hour. The characteristic values of the copolymer solutions are measured after the solutions have passed through the reactors no less than 4 times, ie. when not less than 21,600 parts by weight have been fed through.

The results are shown in the Table below.

| Example No. | Internal temperature [°C] | | | Feed into reactor 1 | | | Feed into reactor 2 | | |
|---|---|---|---|---|---|---|---|---|---|
| | R1 | R2 | R3 | Mixture 1 [parts] | Mixture 2 [parts] | Mixture 3 [parts] | Mixture 4 [parts] | Mixture 5 [parts] | Mixture 6 [parts] |
| 1 | 100 | 100 | 100 | 153.4 $H_2O$<br>72.3 MAA<br>150 AA | 28.5 $H_2O_2$, 30% strength<br>56 $H_2O$ | 85 NaOH<br>225 $H_2O$ | 50 $H_2O$<br>50 AA | — | — |
| 2 | 100 | 100 | 100 | 153.4 $H_2O$<br>72.3 MAA<br>150 AA | 28.5 $H_2O_2$, 30% strength<br>56 $H_2O$ | 70 NaOH<br>210 $H_2O$ | 50 $H_2O$<br>50 AA | 15 NaOH<br>45 $H_2O$ | 7 $H_2O_2$, 30% strength<br>13 $H_2O$ |
| 3 | 90 | 100 | 100 | 153.4 $H_2O$<br>143 MA<br>71.5 AA | 28.5 $H_2O_2$, 30% strength<br>56 $H_2O$ | 83 NaOH<br>249 $H_2O$ | 71.5 $H_2O$<br>71.5 AA | 24 NaOH<br>72 $H_2O$ | 2.46 $Na_2S_2O_8$<br>25 $H_2O$ |
| 4 | 100 | 100 | 120 | 153.4 $H_2O$<br>72.3 MAA<br>150 MAC | 28.5 $H_2O_2$, 30% strength<br>56 $H_2O$ | 80 NaOH<br>240 $H_2O$ | 50 $H_2O$<br>50 AA | — | — |
| 5 | 80 | 90 | 100 | 130 $H_2O$<br>98.4 IA<br>100 AA | 3.7 $Na_2S_2O_8$<br>12.3 $H_2O_2$, 30% strength<br>56 $H_2O$ | 58 NaOH<br>174 $H_2O$ | 47.6 AA<br>50 $H_2O$ | 13 NaOH<br>25 $H_2O_2$ | 1.3 $(NH_4)_2S_2O_8$<br>25 $H_2O$ |
| 6 | 100 | 100 | 100 | 50 $H_2O$<br>20 MA<br>20 CA<br>20 AA<br>20 MAA | 10 $H_2O_2$, 30% strength<br>10 $H_2O$ | 33 KOH<br>28.5 $H_2O$ | 10 AA<br>10 MAA<br>20 $H_2O$ | — | 25 $H_2O_2$, 30% strength<br>7.5 $H_2O$ |
| 7 | 100 | 100 | 100 | 153.4 $H_2O$<br>72.3 MAA<br>110 AA<br>14.25 HEA<br>14.25 VAc | 28.5 $H_2O_2$, 30% strength<br>56 $H_2O$ | 60 NaOH<br>60 $H_2O$ | 33 AA<br>14.25 VA<br>14.25 VP | 15 NaOH<br>15 $H_2O$ | 14 $H_2O_2$, 30% strength<br>25 $H_2O$ |
| 8 | 100 | 100 | 100 | 153.4 $H_2O$<br>72.3 MAA<br>110 AA<br>14.25 DMAEA<br>14.25 MA | 28.5 $H_2O_2$, 30% strength<br>56 $H_2O$ | 60 NaOH<br>60 $H_2O$ | 33 AA<br>14.25 DMAEA<br>14.25 AN | — | 14 $H_2O_2$, 30% strength<br>25 $H_2O$ |
| 9 | 120 | 120 | 120 | 153.4 $H_2O$<br>143 MA<br>71.5 AA | 28.5 $H_2O_2$, 30% strength<br>56 $H_2O$ | 83 NaOH<br>249 $H_2O$ | 71.5 $H_2O$<br>71.5 AA | 24 NaOH<br>72 $H_2O$ | 25 $H_2O_2$, 30% strength<br>25 $H_2O$ |
| 10 | 100 | 100 | 100 | 153.4 $H_2O$<br>72.3 MAA<br>150.0 AA<br>3.0 $Na_2S_2O_5$ | 28.5 $H_2O_2$, 30% strength<br>56 $H_2O$ | 83 NaOH<br>249 $H_2O$ | 50 $H_2O$<br>50 AA | — | — |

| Example No. | Feed into reactor 3 mixture 7 [parts] | Solids content [%] | K value of the disodium salt 2% strength in $H_2O$] | Residual content of monomeric dicarboxylic acid [%] |
|---|---|---|---|---|
| 1 | — | 37 | 46 | 0.76 |
| 2 | — | 36 | 45 | 0.41 |
| 3 | — | 33 | 43 | 0.65 |
| 4 | 7 $H_2O_2$, 30% strength 13 $H_2O$ | 38 | 56 | 0.16 |
| 5 | 4.5 $H_2O_2$, 30% strength 15 $H_2O$ | 35 | 53 | 0.11 |
| 6 | — | 39 | 44 | 0.22 |
| 7 | — | 44 | 39 | 0.34 |
| 8 | — | 42 | 49 | 0.42 |
| 9 | — | 32 | 29 | 0.08 |
| 10 | — | 37 | 43 | 0.46 |

Abbreviations:
MAA = maleic anhydride
MA = maleic acid
IA = itaconic acid
CA = citraconic acid
AA = acrylic acid
MAC = methacrylic acid
HEA = hydroxyethylacrylate
VAc = vinyl acetate
AN = acrylonitrile
VA = vinylsulfonic acid
DMAEA = dimethylaminoethyl acrylate
MA = methyl acrylate
VP = vinylphosphonic acid

We claim:
1. A process for the preparation of a copolymer having a K value of 8–100 which contains, as copolymerized monomer units, monoethylenically unsaturated mono- and dicarboxylic acids, comprising:
 copolymerizing (a) from 10 to 60% by weight of a monoethylenically unsaturated dicarboxylic acid selected from the group consisting of maleic acid, itaconic acid, mesaconic acid, fumaric acid, methylenemalonic acid, citraconic acid, salts thereof and anhydrides thereof, and (b) from 90 to 40% by weight of acrylic acid or methacrylic acid, the percentage being based on the sum of the monomers, in the presence of from 0.5 to 6% by weight of a water-soluble, free-radical forming initiator in an aqueous medium having a concentration of reacting monomers of from 20 to 70% at a temperature from 60° to 150° C., optionally the anhydride groups of said reacting monoethylenically unsaturated dicarboxylic acid being hydrolyzed, said monomers (a) and (b) being employed in a form such that from 20 to 80% of their amounts are neturalized during the polymerization reaction, said copolymerization being conducted continuously in a cascade of several reactors in which an aqueous solution of a preprepared copolymer of monomers (a) and (b) is initially introduced into all of the reactors and heated to the required reaction temperature, the total amount of unneutralized or partially neutralized monomer (a), and a portion of unneutralized or partially neutralized monomer (b), and some or all of the amount of initiator required for polymerization, with or without the amount of neutralizing agent required for the neutralization according to the definition, being metered into the first reactor, the remaining amount of unneutralized or neutralized monomer (b) and any remaining amount of initiator and neutralizing agent which may be required being introduced into the second reactor or being distributed over the second reactor and the downstream reactors such that the ratio of the amount of monomer (b) introduced into at least the second reactor relative to the amount of monomer (b) introduced into the first reactor ranges from 33/110 to 71.5/71.5 on a part by weight basis, and the reactants being allowed to react together over a residence time of from 0.5 to 8 hours.

2. The process of claim 1, wherein said dicarboxylic acid or salt thereof is maleic acid.

3. The process of claim 1, wherein the reactor cascade consists of three kettles.

4. The process of claim 1, wherein the K value of said copolymer ranges from 10–60.

5. The process of claim 1, wherein the monomer concentration in solution ranges from 40 to 60%.

6. The process of claim 1, wherein said water-soluble, free-radical-forming initiator is hydrogen peroxide, a peroxydisulfate, or combinations thereof.

7. The process of claim 1, wherein, when monomers (a) and (b) are in the salt form, the salts are the alkali metal salts.

8. The process of claim 1, wherein the time of reaction ranges from 1 to 5 hours.

9. The process of claim 1, wherein the polymerization reaction is conducted at a temperature of 80° to 130° C.

10. The process of claim 1, wherein from 30 to 70% of the monomers are neutralized during polymerization.

* * * * *